May 4, 1965   A. R. SANTOS   3,181,736
FEED WAGON SPRAY ATTACHMENT
Filed May 13, 1963   2 Sheets-Sheet 1

ANTHONY R. SANTOS
INVENTOR

Huebner & Worrel
ATTORNEYS

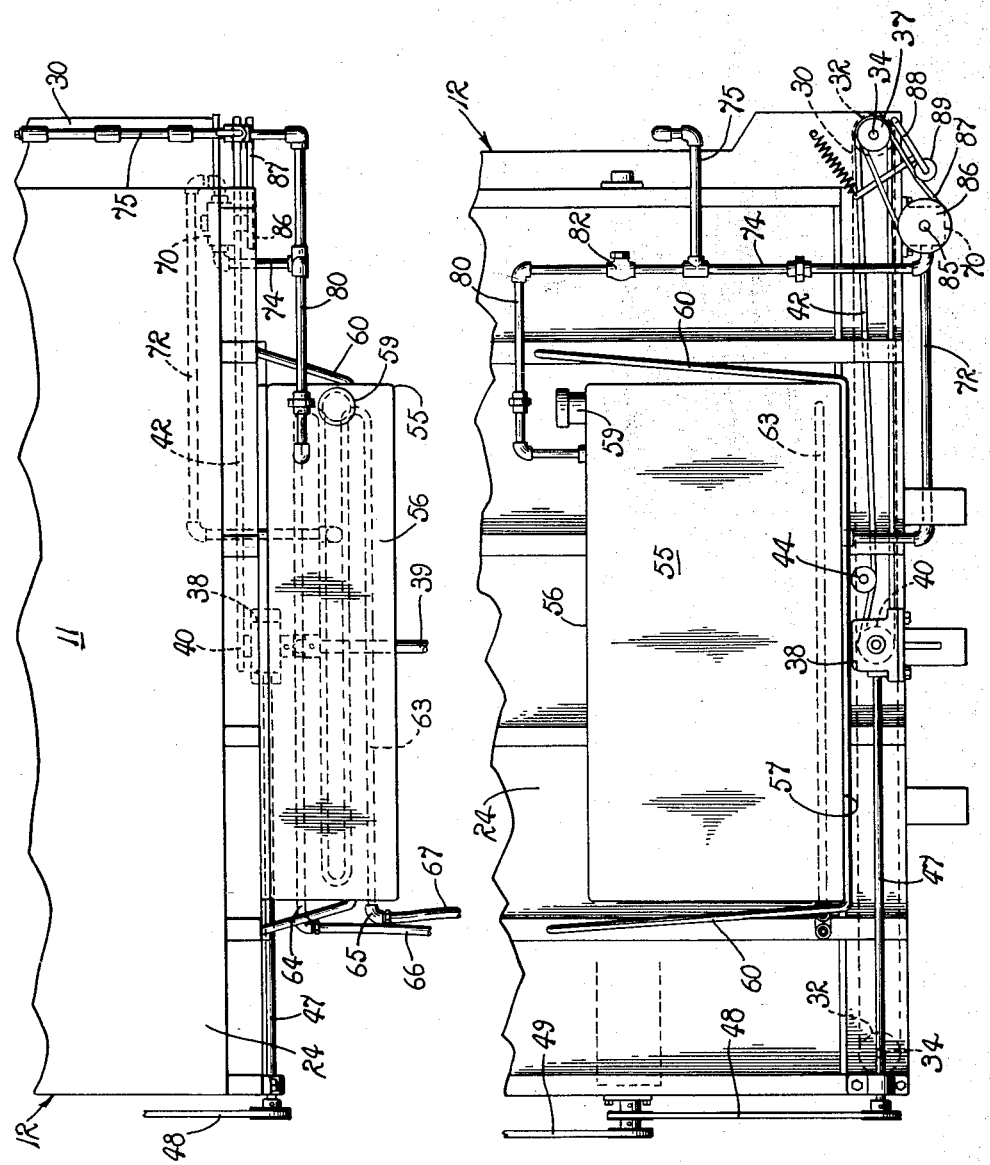

United States Patent Office 3,181,736
Patented May 4, 1965

3,181,736
FEED WAGON SPRAY ATTACHMENT
Anthony R. Santos, 3298 Ave. 192, Tulare, Calif.
Filed May 13, 1963, Ser. No. 279,942
5 Claims. (Cl. 222—135)

The present invention relates to a feed wagon spray attachment for treating feed material and more particularly to such an attachment which automatically treats such feed material during its discharge from the wagon into a feeding bin, trough or the like.

Automatic discharge feed wagons are customarily employed in the distributing of chopped feed material, such as alfalfa hay, grass, and silage, and other flowable feed such as ear corn and the like. Such wagons are usually drawn along a livestock feeding trough or other feeding receptacle and have a conveyor which discharges feed transversely of the wagon into the trough. In many instances, livestock feeding practices require that a liquid feed supplement such as vitamin enriched molasses or the like be added to the dry feed in order to provide a balanced or enriched diet for the livestock. In the past, the addition of such liquid feed supplement has been accomplished by manually applying such liquid on the dry feed material in the trough. Such practice requires an additional operation completely independent from the initial placement of dry feed material in the trough. This creates a problem when feeding in an area occupied by the livestock in that a large portion of the dry feed material may be consumed before the liquid supplement can be applied. Further, the mixing operation is difficult to perform in such troughs and usually is not properly accomplished. It has been found to be impractical to attempt the application of liquid supplement prior to the discharge of the dry feed material from the wagon. The main problem in this respect is that the liquid feed supplement usually has a high sugar content and is therefore extremely sticky which, when transferred to the components of the wagon, attracts and accumulates dirt which causes balling of the feed material and clogging of the wagon conveyors and other movable elements.

Therefore, it is an object of the present invention to provide a feed wagon spray attachment capable of treating feed material during its discharge therefrom in a single operation.

Another object is to provide a feed wagon spray attachment which is capable of automatic application of liquid feed supplements to dry feed material synchronously with the discharge of such dry material from the wagon.

Another object is to provide a feed wagon spray attachment which is simply constructed and readily adapted to existing feed wagons.

Another object is to provide a feed wagon spray attachment which is capable of such application of liquid feed supplement with a minimum of spilling and transfer of the liquid to the wagon.

Another object is to provide a feed wagon spray attachment having a liquid pumping member which can be driven synchronously with the wagon discharge conveyor to insure optimum coverage of the feed material being discharged and proportional distribution.

Another object is to provide a feed wagon spray attachment providing a controlled volume of spray proportionately related to the speed of the feed material discharge conveyor.

Another object is to provide a feed wagon spray attachment which is capable of maintaining the liquid feed supplement at its optimum flowable consistency.

Other objects and advantages of the present invention will subsequently become more clearly apparent upon reference to the following description in the specification.

In the drawings:

FIG. 3 is a somewhat enlarged fragmentary top plan of the feed wagon spray attachment.

FIG. 4 is a somewhat enlarged fragmentary front elevation of the feed wagon spray attachment.

Figure 1:
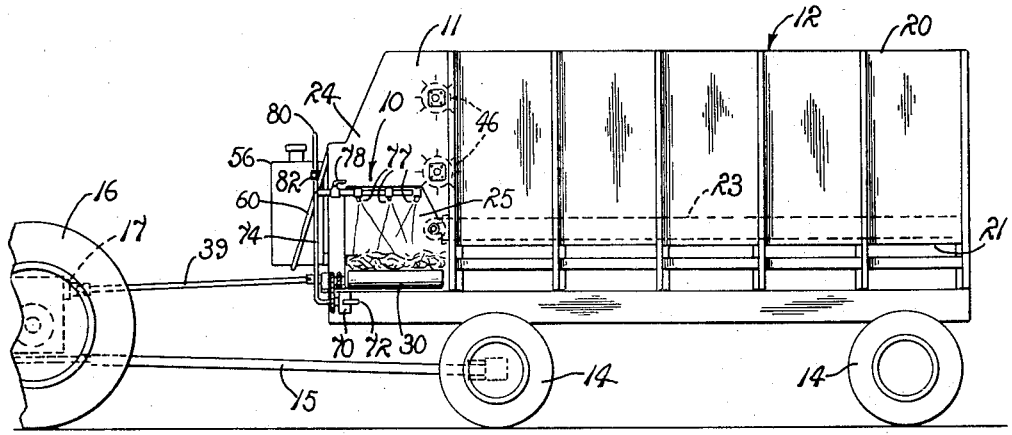
FIG. 1 is a side elevation of a feed wagon having the spray attachment of the present invention mounted thereon.
Figure 2:
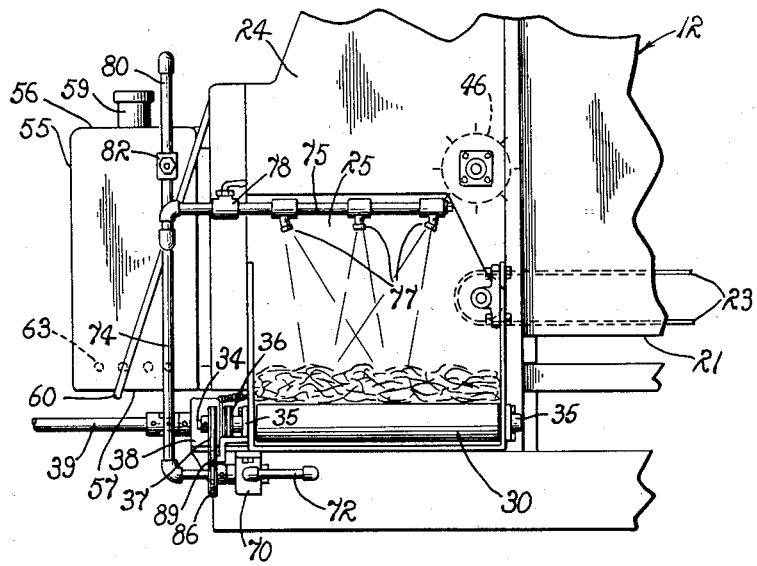
FIG. 2 is a somewhat enlarged fragmentary side elevation of the feed wagon spray attachment of FIG. 1.

The feed wagon spray attachment of the present invention is indicated at 10 mounted on the forward end 11 of a feed wagon 12. The feed wagon is supported on a plurality of ground engaging wheels 14 and is adapted to be motivated in ground traversement by a tongue 15 connected to a tractor or other prime mover partially shown at 16. The tractor provides a power take off indicated in dashed lines at 17. The feed wagon includes a feed box 20 having a bed portion 21 supporting a feed supply conveyor 23. The feed box forwardly opens into a hopper compartment 24 at the forward end of the wagon which has a transversely disposed exhaust opening 25.

An elongated endless feed discharge conveyor 30 is supported at its opposite ends on rollers 32 so as to extend transversely of the wagon and to form a bottom wall for the hopper 24. The conveyor rollers 32 are mounted on elongated shafts 34 which are journaled in bearings 35 secured to the wagon. The shaft roller at the exhaust opening 25 from the hopper provides a forwardly extended portion on which is mounted a pair of V-belt pulleys 36 and 37. A power transfer box 38 is mounted on the forward end 11 of the wagon and is connected to the power take off 17 on the tractor 16 by a universal coupling assembly 39. A drive pulley 40 is mounted rearwardly of the transfer box in coplanar relation with the conveyor pulley 36. An endless V-belt 42 is trained about the pulleys 36 and 40 for driving the feed discharge conveyor 30 in a direction to motivate the upper run thereof from left to right, as viewed in FIG. 4. An idler pulley 44 is rotatably mounted on the forward end of the wagon adjacent to the transfer box 38 and in rolling engagement with the V-belt 42 thereby to tension the belt about the pulleys 36 and 40 to insure frictional driving contact. As best shown in FIG. 1, a pair of cylindrical beaters 46 are disposed in transversely extended vertically spaced relation at the forward end of the wagon for preconditioning crop material delivered by the feed supply conveyor 23. The beaters are driven from the power transfer box 38 by an elongated drive shaft 47 extended therefrom which has an extended end mounting a pulley and belt assembly 48 connected to the lowermost of the beaters 46. The upper beater is in turn driven by a pulley and drive belt assembly partially shown at 49 in FIG. 4.

A tank 55, which is adapted to contain a liquid feed supplement such as molasses or the like, is mounted on the forward end 11 of the feed wagon 12. The tank includes top and bottom walls 56 and 57 respectively with the top wall providing an extended capped filling spout 59. The tank is mounted on the forward end of the wagon by a hanger strap 60 connected at its ends to the wagon and extended beneath the bottom wall 57 of the tank in cradling relation thereto. An endless heat exchanging coil 63 having a plurality of return loops is mounted within the tank adjacent to the bottom wall 57 thereof and provides a pair of opposite ends 64 and 65 extended transversely outwardly of the tank. A pair of elongated flexible hoses, fragmentarily shown at 66 and 67 in FIG. 3, are individually connected to the ends 64 and 65 of the coil and to the head and bottom of the radiator, respectively, not shown, of the engine cooling system of the tractor 16.

A fluid pump 70, preferably of the constant displacement gear type, is mounted on the forward end 11 of the wagon 12 adjacent to the opening of the hopper 24. The pump has an inlet conduit 72 connected to the bottom wall 57 of the tank 55 in communication with the interior of the tank. The pump also provides an outlet conduit 74 which is extended in substantially upright position forwardly adjacent to the exhaust opening 25 from the hopper 24. A fluid discharge conduit 75 is connected to the outlet conduit 74 transversely outwardly of the wagon and thence longitudinally rearwardly thereof in spaced substantially parallel relation above the discharge conveyor 30. A plurality of sprayer nozzles 77 are mounted in the discharge conduit in downwardly extended positions in facing relation to the discharge conveyor. A shut-off valve 78 is disposed in the discharge conduit downstream of the nozzles for controlling the flow of fluid therethrough. The outlet 74 of the pump includes an upwardly extended portion 80 which is connected to the top wall of the tank. A relief valve 82 is disposed within the extended portion 80 of the outlet conduit 74 to bypass fluid back to the tank upon a predetermined high pressure in the outlet and discharge conduits 74 and 75, respectively.

The pump 70 provides an extended drive shaft 85 which mounts a pulley 86 in spaced coplanar relation with the pulley 37 on the discharge conveyor drive shaft 34. An endless V-belt 87 is trained about the pulleys 37 and 86 for driving the pump in synchronization with the conveyor so as to discharge fluid only when the conveyor is in operation. A belt tightening mechanism 88 provides an idler roller 89 having a spring tensioned mounting which engages the belt 87 to maintain the desired frictional contact of the belt with the pulleys.

Operation

The operation of the described embodiment of the subject invention is believed to be clearly apparent and is briefly summarized at this point. With the feed wagon 12 connected to the tractor 16, as shown in FIG. 1, the feed box 20 thereof is loaded with the desired feed crop, the tank 55 is filled by way of the spout 59 with liquid feed supplement and the wagon is drawn into a livestock feeding area alongside a feeding trough, or the like. The power take off 17 on the tractor is actuated to drive the power transfer box 38 on the wagon through the universal coupling assembly 39. Such drive is transmitted through the pulley and belt assemblies 48 and 49 to the beaters 46 and to the feed supply conveyor 23 in the bed portion 21 of the feed box 20 in the usual manner. Such action motivates the feed within the feed box forwardly against the beaters which shred, loosen, fluff and otherwise precondition the feed while discharging the same into the hopper 24. The crop falls upon the discharge conveyor 30 with the upper run thereof being traveled transversely outwardly of the wagon in a direction from left to right, as viewed in FIG. 4. The discharge conveyor is driven for circuitous movement about the end rollers 32 by the V-belt 42 and pulleys 36 and 40 connecting the conveyor with the drive power transfer box 38.

Such drive is also transmitted to the pump 70 during movement of the conveyor 30 to draw the liquid feed supplement from the tank through the inlet conduit 72. The fluid is then motivated by the pump through the outlet conduit 74 thereof and into the discharge conduit 75. With the shut-off valve 78 in the open position, such fluid is dispersed in a spray pattern from the nozzles 77 upon the crop being discharged by the conveyor 30. Since the nozzles are positioned in substantial vertical alignment with the end roller 32 of the conveyor, the spray of such fluid falls only on the crop at its precise moment of discharge and thereby does not contaminate the discharge conveyor. If it is desired to interrupt the flow of fluid from the nozzles 77, the shut-off valve 78 is positioned to block such flow. This causes pressure rise in the discharge conduit whereupon the relief valve 82 automatically opens to bypass the fluid output from the pump back into the tank through the extended portion 80 of the outlet conduit 74.

The flowability of the liquid feed supplement is insured by the heat exchanging coil 63 within the tank. During operation of the tractor 16, hot water from the engine cooling system is directed through the hoses 66 and 67 to circulate through the coil. The coil thereby conducts such heat to the liquid adjacent to the bottom of the tank to maintain the fluid adjacent to the outlet from the tank at its optimum consistency for easy flow through the inlet conduit 72, the pump 70 and the nozzles 77.

In view of the foregoing, it is readily apparent that the structure of the present invention has provided an improved spray attachment for feed wagons. The heat exchanging coil 63 within the tank insures that the liquid feed supplement is maintained at optimum flowability for deposit upon the feed crop being discharged from the wagon even during the coldest of winter weather. Such liquid is sprayed against the crop at its precise moment of discharge from the wagon thereby to maintain the discharged conveyor in a clean operating condition.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A feed wagon attachment to be mounted on a feed wagon adapted for earth traversing movement therewith comprising a conveyor having a discharge end for discharging feed from the wagon, powered means having driving connection to said conveyor, a tank mounted on the wagon for containing liquid feed supplement, liquid discharge means mounted on the wagon adjacent to the discharge end of the conveyor, said discharge means having connection to the tank, pumping means on the wagon disposed in liquid communication between the discharge means and the tank, and drive means connecting said pumping means with the conveyor for synchronous operation therewith incident to movement of the conveyor so as to motivate and disperse such feed supplement outwardly of the discharge means against feed synchronously with its discharge from the discharge end of the conveyor.

2. A feed wagon attachment adapted to be mounted on a feed wagon for earth traversing movement therewith comprising a conveyor having a discharge end transversely outwardly extended from the wagon for discharging feed therefrom, a tank mounted on the wagon for containing liquid feed supplement and including upper and lower sides, a liquid discharge conduit mounted on the wagon in superimposed relation to said discharge end of the conveyor, a pump having an inlet conduit connected to the tank and a discharge conduit connected to said liquid discharge conduit on the wagon, and drive means connecting the pump to the conveyor to motivate such liquid feed supplement from the tank outwardly of the discharge conduit against feed synchronously with its discharge from the discharge end of the conveyor.

3. A feed wagon attachment, adapted to be mounted on a feed wagon connected for earth traversing movement with a tractor having an engine cooling system, comprising a power driven conveyor having a discharge end transversely extended from the wagon for discharging feed therefrom, a tank mounted on the wagon for containing liquid feed supplement, liquid discharge means mounted on the wagon adjacent to the discharge end of the conveyor, pumping means on the wagon connected between the discharge means and the tank, means providing driving connection between the pumping means and the conveyor to motivate such liquid feed supplement outwardly of the discharge means against feed synchronously with the discharge of the feed from the discharge end of said conveyor, and heat exchanging means disposed within the tank connected to said cooling system on the tractor to receive heat from the cooling system and to transfer such heat to liquid in the tank to insure flowability of liquid through said pumping means and through said discharge means.

4. A feed wagon attachment, adapted to be mounted on a feed wagon connected for earth traversing movement with a tractor having an engine cooling system, comprising a power driven conveyor having a discharge end outwardly extended from the wagon for discharging feed therefrom, a tank mounted on the wagon for containing liquid feed supplement, a liquid discharge conduit mounted on the wagon in superimposed relation to said discharge end of the conveyor, a pump having an inlet conduit connected to the tank and a discharge conduit connected to said liquid discharge conduit on the wagon, drive means connecting the pump to the conveyor to motivate such liquid feed supplement from the tank outwardly of the discharge conduit against feed synchronously with the discharge of the feed from the discharge end of the conveyor, and a heat exchanging member disposed within the tank having predetermined inlet and outlet conduits extended outwardly therefrom connected to said engine cooling system of the tractor to receive heat therefrom so as to transfer such heat to the liquid in the tank to insure flowability of the liquid therefrom.

5. A feed wagon attachment, adapted to be mounted on a feed wagon connected for earth traversing movement with a tractor having an engine cooling system and a power take off, comprising a feed discharge conveyor, having a discharge end transversely outwardly extended from the wagon for discharging feed therefrom a tank mounted on the wagon containing liquid feed supplement and having predetermined upper and lower sides, a constant displacement pump having an inlet conduit connected to the lower side of the tank and an outlet conduit, a liquid discharge conduit connected to said outlet conduit of the pump disposed in spaced transversely extended relation to the discharge end of the conveyor and having a plurality of liquid dispersing nozzles opening therefrom in facing relation to the discharge end of the conveyor, drive means on the wagon connected to the power take off of the tractor connected in driving relation to the conveyor and to the pump for synchronous operation so that such liquid feed supplement is dispersed by the pump from said nozzles against feed synchronously with the discharge of the feed from the discharge end of the conveyor, and an elongated heat exchanging coil mounted within the tank adjacent to the lower side thereof having predetermined inlet and outlet hoses extended outwardly therefrom connected to said engine cooling system of the tractor to receive heat therefrom so as to transfer such heat to the liquid in the tank to insure flowability of the liquid through the pump and nozzles.

References Cited by the Examiner
UNITED STATES PATENTS

| | | | |
|---|---|---|---|
| 1,705,649 | 3/29 | Scott | 222—146 X |
| 2,102,584 | 12/37 | Brown | 222—57 |
| 2,296,505 | 9/42 | Diehl | 222—135 X |
| 2,503,129 | 4/50 | Pautz | 214—520 |
| 2,872,166 | 2/59 | Roberts | 222—136 X |

RAPHAEL M. LUPO, *Primary Examiner.*